United States Patent [19]
Hoag et al.

[11] 4,079,806
[45] Mar. 21, 1978

[54] VEHICLE STARTING CIRCUIT TO BY-PASS AUXILIARY STEERING SYSTEM

[75] Inventors: Peter J. Hoag, Arlington Heights; Carl A. Keyzer, Mundelein; Michael W. Steffens, Waukegan, all of Ill.

[73] Assignee: Fiat-Allis Construction Machinery, Inc., Deerfield, Ill.

[21] Appl. No.: 751,378

[22] Filed: Dec. 17, 1976

[51] Int. Cl.² .............................. B62D 5/06
[52] U.S. Cl. .................................. 180/133
[58] Field of Search ............... 180/133; 60/403, 405; 417/3

[56] References Cited

U.S. PATENT DOCUMENTS

| | | |
|---|---|---|
| 3,083,533 | 4/1963 | Schenkelberger ............ 60/405 |
| 3,434,282 | 3/1969 | Shelhart ................... 180/133 |
| 3,558,239 | 1/1971 | Schiber .................... 180/133 |
| 3,762,492 | 10/1973 | Ron ....................... 180/133 |
| 3,921,748 | 11/1975 | Dunn ...................... 180/133 |
| 3,940,931 | 3/1976 | Renfro .................... 60/403 |

Primary Examiner—Joseph F. Peters, Jr.
Assistant Examiner—R. Schrecengost
Attorney, Agent, or Firm—August E. Roehrig, Jr.; Robert A. Brown; Harvey W. Rockwell

[57] ABSTRACT

An electric circuit for use in the ignition system of a vehicle having an auxiliary steering system powered by the vehicle battery which is energized upon engine failure or shut down during vehicle operation. The ignition circuit disconnects the auxiliary steering system from the vehicle battery during engine starting to eliminate unnecessary drain on the vehicle battery.

6 Claims, 2 Drawing Figures

VEHICLE STARTING CIRCUIT TO BY-PASS AUXILIARY STEERING SYSTEM

BACKGROUND OF THE INVENTION

This invention relates in general to vehicle ignition systems and, in particular, to ignition systems for vehicles having an auxiliary or emergency steering system which is actuated upon engine failure during operation of the vehicle.

More specifically, but without restriction to the particular use which is shown and described, this invention relates to a vehicle ignition circuit which electrically isolates an auxiliary steering system during vehicle starting to eliminate drain on the vehicle battery.

In the operation of large vehicles such as those utilized in the construction machinery industry, due to the size of the vehicle and the function it is to perform hydraulics are utilized to control operations of the vehicle such as power steering and brakes. Power steering and brake systems on such vehicles are required due to the vehicle size and weight, but can present a safety hazard in the event of a failure of the main hydraulic system such as occurs when the engine stalls or fails during vehicle operation. Therefore, it is necessary to have an auxiliary or emergency power supply for the hydraulic system to control the vehicle braking and steering to safeguard the machine operator and others who may be in the area where the vehicle is operating.

The hydraulic fluid required for power steering and power brakes is normally provided by a hydraulic pump driven by the vehicle engine to supply the power steering and brake units, as well as to operate hydraulically powered auxiliary equipment such as dozer or grader blades depending upon the particular type of equipment utilized with the vehicle. However, when the engine stalls or stops during operation, the hydraulic pump supplying fluid to these components is no longer operated by the engine and, therefore, the loss of pressurized hydraulic fluid results in the loss of steering and brakes.

In order to eliminate this potential safety hazard, auxiliary or emergency hydraulic pumping systems are incorporated in such vehicles. Such systems usually include an electrically driven motor and pump unit, powered from the vehicle batteries, to provide hydraulic fluid under pressure to the vehicle brake and steering systems in the event the engine or the engine-driven main hydraulic pump is inoperative for any reason. One such auxiliary system is disclosed in U.S. Pat. No. 3,153,462, which describes an electrically powered auxiliary or emergency steering system manually actuated by the machine operator upon the occurrence of an emergency condition or the failure of the engine during operation. However, by the time the machine operator realizes that an emergency condition has occurred, it may be too late to energize the auxiliary system in time to avoid an accident. Therefore, various automatic control circuits have been developed to actuate an auxiliary or emergency hydraulic pump and motor system for supplying pressurized hydraulic fluid to the steering and/or brake mechanism in the event the engine or main engine-driven hydraulic pump fails. Such systems are disclosed in U.S. Pat. Nos. 2,954,671; 3,434,282; 3,847,243; 3,896,617; and 3,940,931, which detect failure of the main hydraulic system or the vehicle engine by sensing either the pressure in the hydraulic system or the flow of hydraulic fluid through the system.

However, the use of such auxiliary or emergency pumping systems creates a problem. During starting of the vehicle, when the greatest drain on the vehicle battery occurs, the engine is not running. This lack of hydraulic fluid pressure in the lines is detected by the sensors of the auxiliary or emergency pumping system as an engine failure. Therefore, the auxiliary system is coupled into the vehicle ignition circuit to provide steering and/or braking which are not needed at that time. The resultant coupling of the auxiliary pumping or emergency steering system during engine startup adds drain to the vehicle batteries diverting power frequently required to start the engine.

In order to eliminate this problem of imposing an additional drain on the vehicle battery during startup, one solution is disclosed in U.S. Pat. No. 3,921,748, wherein a logic system of relays is provided in a vehicle ignition system. The disclosed logic system places the emergency pumping system into a condition for actuation only after the engine has been in operation. After being conditioned for actuation, in the event of engine failure, the emergency pumping system will be coupled into the electrical circuitry to actuate a pump to effect steering and braking. However, when the engine is shut off, the emergency or auxiliary pumping system is removed from the ignition circuit and is not in condition to operate until such time as the engine is restarted to place it in a proper condition to be actuated.

While such a system eliminates some of the problems associated with draining the battery during operation of the starting mechanism, such a system is expensive and complex creating additional problems through components whose failure would result in an inoperative emergency system. In addition, such a system is unable to be used in moving a disabled vehicle.

SUMMARY OF THE INVENTION

It is, therefore, an object of this invention to improve coupling of auxiliary or emergency vehicle hydraulic pumping systems to the vehicle ignition system to eliminate the drain on the vehicle battery during startup.

Another object of this invention is to electrically isolate an auxiliary or emergency pumping system during engine startup through a minimum of electrical components to increase system reliability.

These and other objects are attained in accordance with the present invention wherein there is provided an electric circuit for use in the ignition system of a vehicle having an auxiliary hydraulic fluid pumping system powered by the vehicle battery and energized upon engine failure or shutdown during vehicle operation to disconnect the auxiliary system from the battery during engine starting.

DESCRIPTION OF THE DRAWINGS

Further objects of the invention, together with additional features contributing thereto and advantages accruing therefrom, will be apparent from the following description of a preferred embodiment of the invention which is shown in the accompanying drawings wherein like reference numerals indicate corresponding parts throughout, wherein.

DESCRIPTION OF A PREFERRED EMBODIMENT

Figure 1:
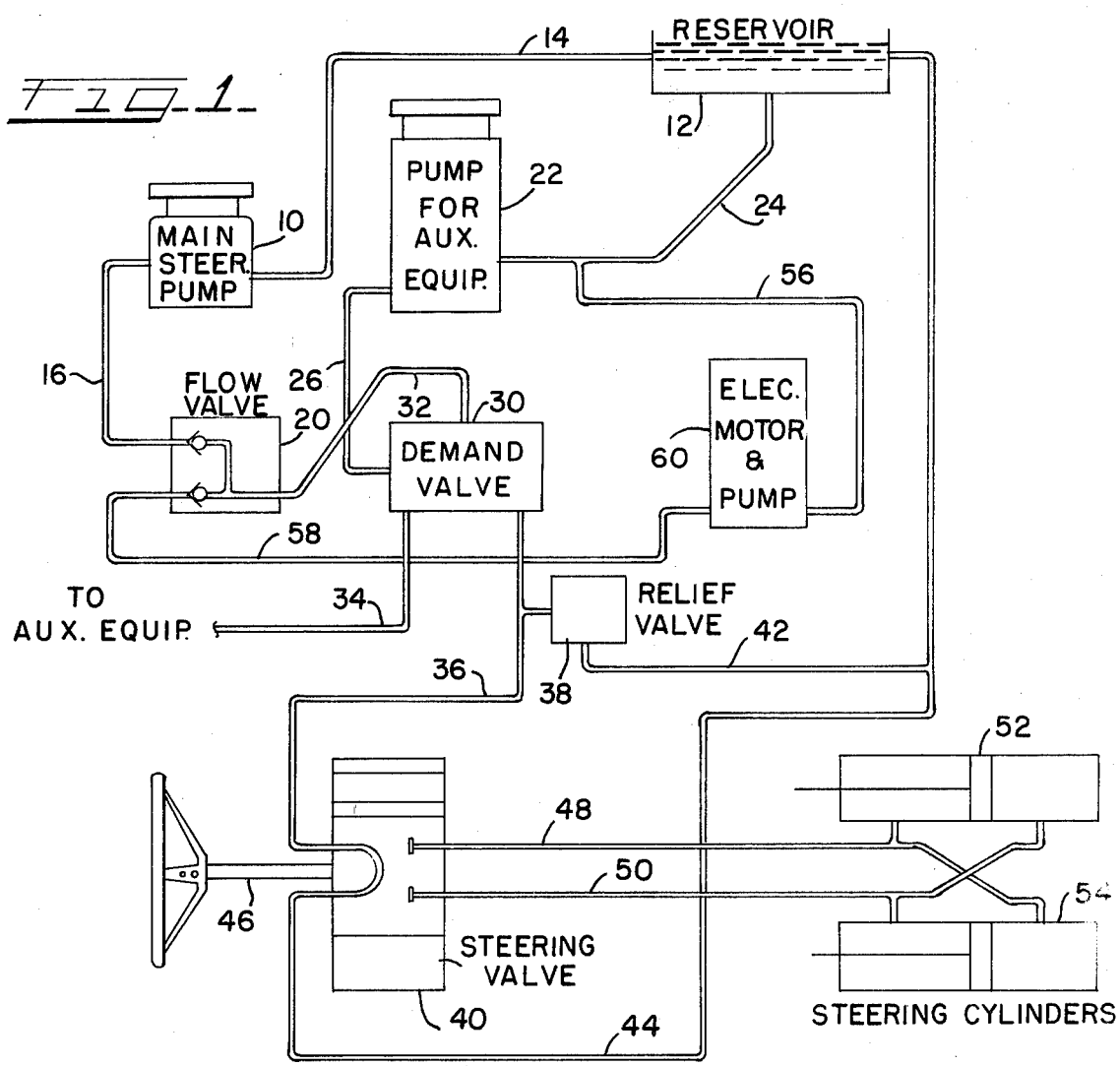
FIG. 1 is a hydraulic schematic of a vehicle hydraulic system for steering a vehicle and providing hydraulic fluid to operate auxiliary equipment.

Referring now to FIG. 1 there is shown a typical hydraulic system for a vehicle of the type previously discussed which includes a main hydraulic pump 10 used to effect steering of the vehicle and a hydraulic pump 22 for supplying pressurized fluid to auxiliary equipment used with the vehicle such as dozer blades or loading buckets. Both the hydraulic pumps 10 and 22 are driven by the vehicle engine (not shown) and are connected to a hydraulic fluid reservoir 12 through conduits 14 and 24, respectively. The output from the main steering pump 10 and the auxiliary equipment pump 22 are connected to a demand valve 30 by means of conduits 16 and 26, respectively. The demand valve 30 controls a flow of the hydraulic fluid to the steering system through a conduit 36 or to the auxiliary equipment through a conduit 34. As is well known to those skilled in the art, the demand valve 30 functions to control the flow of hydraulic fluid such that the steering system is given priority over the auxiliary equipment to insure that sufficient hydraulic fluid is provided for steering purposes at all times.

In order to monitor the operation of the main steering pump 10, a sensor valve 20 is coupled between the main steering pump 10 and the demand valve 30. Hydraulic fluid pumped from the main steering pump 10 through the conduit 16 will pass through the sensor valve 20 and then through a conduit 32 into the demand valve 30. The valve 20 may be of a type having a set of electrical contacts associated therewith that are sensitive either to pressure in the hydraulic system or flow of hydraulic fluid. While the valve 20 is illustrated as being sensitive to fluid flow, both the pressure sensitive or flow sensitive type are suitable such as described in the afore-mentioned patents.

As long as the vehicle engine is in operation, the main steering pump 10 will supply pressurized fluid flow through the sensor valve 20 to the demand valve 30. Hydraulic fluid passing through the valve 20 will maintain the associated electrical contacts open isolating the auxiliary steering system from operation. In the event the vehicle engine fails or for any other reason the main steering pump 10 does not function to provide a sufficient quantity of hydraulic fluid to the sensor valve 20, the valve will close the associateed electrical contacts illustrated by a pair of switch contacts 20A in FIG. 2. The switch contacts 20A illustrate the interface between the hydraulic circuit of FIG. 1 and the electrical circuit of FIG. 2.

During normal operation hydraulic fluid passing through the demand valve 30 is supplied to a steering valve 40 through the conduit 36 and to auxiliary equipment (not shown) through the conduit 34. The steering valve 40 is connected to a manually operated steering mechanism 46 for actuating a pair of steering cylinders 52 and 54 coupled to the steering valve 40 through conduits 48 and 50, respectively, to steer the vehicle. The hydraulic fluid passing through the steering valve 40 is then returned to the reservoir 12 through a conduit 44. A pressure relief valve 38 is coupled between conduits 36 and 44 to by-pass the steering valve 40 in the event the hydraulic fluid pressure is above a predetermined level.

To provide for an emergency steering system in the event of an engine failure or failure of the main steering pump 10, an electrically operated motor and pump 60 is provided in the hydraulic circuit. The auxiliary or emergency pump and motor 60 is coupled to the reservoir 12 through conduits 24 and 56 and to the demand valve 30 through a conduit 58, the sensor valve 20 and the conduit 32. The motor and pump 60 supplying hydraulic fluid to the demand valve 30 will insure that the steering system is provided with sufficient hydraulic fluid in the event the electric motor 60 is actuated.

Figure 2:
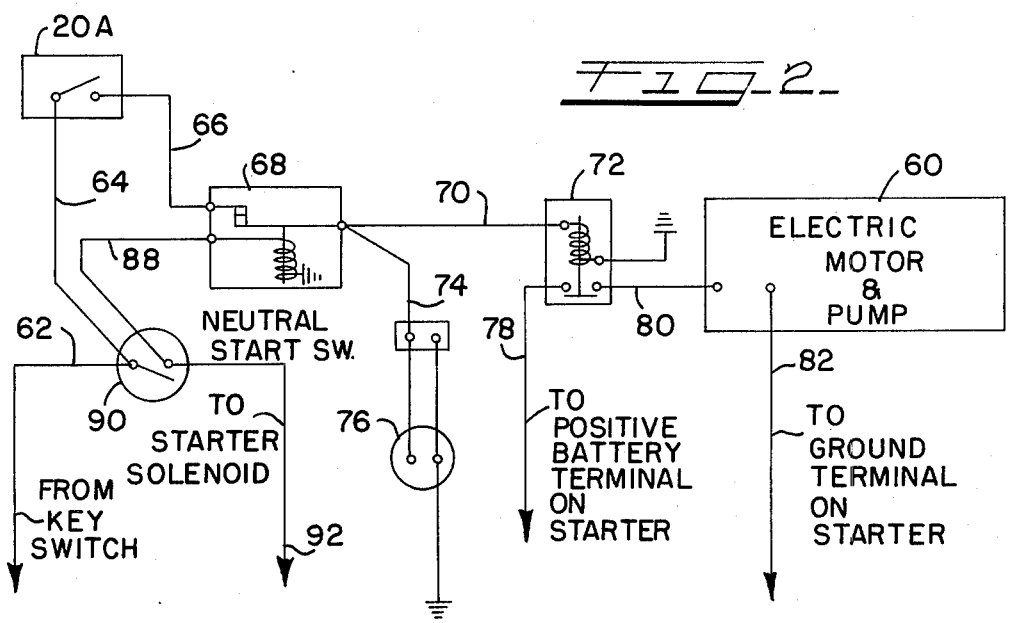
FIG. 2 is an electrical schematic diagram of a portion of the vehicle ignition system to better illustrate the manner in which the auxiliary electric motor and pump are coupled into the system for an emergency while being electrically isolated during engine startup.

Referring now to FIG. 2, in the event of a malfunction of the main steering pump 10 or engine failure, normally open sensor valve 20 will effect closing of the electrical contacts of the pressure or flow sensitive switch associated therewith and illustrated at 20A. Closing of the contacts 20A completes a circuit from the vehicle battery (not shown) through a vehicle key switch (not shown), conductors 62, 64 and 66, normally closed contacts of a cut-out relay 68, conductor 70 and through a coil of a relay 72 to ground. At the same time a warning light and/or buzzer 76 is energized through conductor 74 to provide a warning signal to the machine operator that the engine and/or main steering pump has failed.

Energizing the coil of the relay 72 closes its normally open contacts to complete a circuit coupling the electric motor and pump 60 to the vehicle battery through leads 78, 80 and 82 to ground. The electric motor and pump 60 is thereby energized to pump fluid from the reservoir 12 through the conduits 24, 56 and 58, the valve 20 and the conduit 32 to the demand valve 30 for delivery to the steering valve 40. While a preferred embodiment of this invention which is disclosed herein utilizes relays 68 and 72 to accomplish the desired functions, solid-state electronics, such as transistors, could be substituted for circuit components through proper biasing known to those skilled in the art.

As previously discussed, the electrical contacts 20A associated with sensor valve 20 are closed whenever there is an insufficient flow of hydraulic fluid from conduit 16 through the sensor valve 20. During engine startup the absence of sufficient hydraulic fluid flow would be interpreted by sensor valve 20 as an engine or main pump failure thereby coupling the electric motor and pump into the electrical system providing a drain on the vehicle battery when starting. Therefore, when the transmission of the vehicle is placed in neutral, which is required for starting, contacts of a neutral start switch 90 are closed providing a circuit through conductors 62, contacts 90 and lead 92 to a vehicle starter solenoid (not shown) for starting the engine. The closing of the contacts 90 complete a circuit with a lead 88 connected to the coil of the cut-out relay 68 to open the normally closed contacts of cut-out relay 68 electrically isolating the electric motor and pump and the warning device 76 from the circuit.

Thus whenever the key switch (not shown) is closed, the contacts 20A of the sensor valve 20 control energizing of the electric motor and pump 60 to insure that an emergency steering system is provided at all times. However, when starting the engine, thereby closing the contacts of neutral start switch 90, the normally closed contacts of cut-out relay 68 will open to electrically isolate the electric motor and pump 60 and warning device 76 from the system preventing excessive drain on the battery during startup.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In a vehicle having a vehicle engine-driven hydraulic pump for supplying hydraulic fluid to a vehicle steering system, a vehicle battery driven auxiliary hydraulic pump for supplying hydraulic fluid to the vehicle steering system upon a predetermined decrease in hydraulic fluid supplied from said vehicle engine-driven pump, auxiliary pump actuating means for coupling the vehicle battery-driven auxiliary hydraulic pump to the vehicle battery in response to the occurrence of a predetermined decrease in hydraulic fluid supplied from said vehicle engine-driven pump and a vehicle ignition system including the auxiliary pump actuating means and having a normally open neutral start switch the contacts of which are only closed when starting the vehicle, the improvement comprising a relay having normally closed relay contacts coupling said vehicle battery driven auxiliary hydraulic pump to the vehicle battery in response to said auxiliary pump actuating means and having a relay winding coupled to said normally open neutral start switch to open said normally closed relay contacts upon the closing of said normally open neutral start switch to electrically isolate said vehicle battery driven auxiliary hydraulic pump from the vehicle battery when said neutral start switch contacts are closed.

2. The apparatus of claim 1 further including a relay having normally open contacts and having a winding coupled in series between said vehicle battery driven auxiliary hydraulic pump and said auxiliary pump actuating means to close said normally open contacts in response to said auxiliary pump actuating means for coupling said battery-driven pump to the vehicle battery.

3. The apparatus of claim 1 further including warning means coupled into said vehicle ignition system and actuable in response to said auxiliary pump actuating means for providing a discernible signal to a vehicle operator upon coupling of said auxiliary hydraulic pump to the vehicle battery.

4. The apparatus of claim 1 wherein said auxiliary pump actuating means comprises a fluid operated switch responsive to the flow of hydraulic fluid therethrough.

5. The apparatus of claim 4 wherein said fluid operated switch includes switch contacts normally open in response to flow of hydraulic fluid.

6. In a vehicle having a vehicle engine-driven hydraulic pump for supplying hydraulic fluid to a vehicle steering system, a vehicle battery driven auxiliary hydraulic pump for supplying hydraulic fluid to the vehicle steering system upon a predetermined decrease in hydraulic fluid supplied from said vehicle engine-driven pump, auxiliary pump actuating means for coupling the vehicle battery-driven auxiliary hydraulic pump to the vehicle battery in response to the occurrence of a predetermined decrease in hydraulic fluid supplied from said vehicle engine-driven pump and a vehicle ignition system including the auxiliary pump actuating means and having a normally open neutral start switch the contacts of which are only closed when starting the vehicle, the improvement comprising means normally electrically coupling said vehicle battery-driven auxiliary hydraulic pump to the vehicle battery in response to said auxiliary pump actuating means and electrically coupled to said normally open neutral start switch to automatically uncouple said electrical coupling of said pump to said battery upon the closing of said normally open neutral start switch to electrically isolate said vehicle battery driven auxiliary hydraulic pump from the vehicle battery when said neutral start switch contacts are closed.

* * * * *